Figure 1:
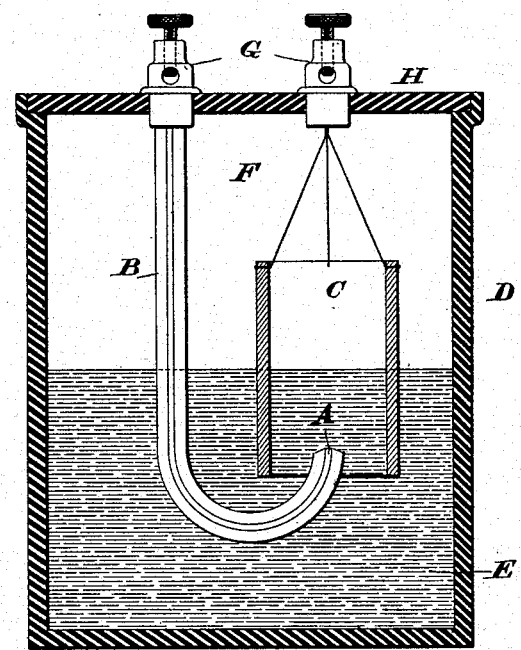

No. 673,953. Patented May 14, 1901.
L. W. HILDBURGH.
ASYMMETRICAL ELECTRICAL CONDUCTOR.
(Application filed Apr. 24, 1899.)

(No Model.)

Witnesses: Inventor
Leo Walter Hildburgh
By Dyer Edmonds & Dyer
Att'ys.

UNITED STATES PATENT OFFICE.

LEO WALTER HILDBURGH, OF NEW YORK, N. Y.

ASYMMETRICAL ELECTRICAL CONDUCTOR.

SPECIFICATION forming part of Letters Patent No. 673,953, dated May 14, 1901.

Application filed April 24, 1899. Serial No. 714,187. (No model.)

*To all whom it may concern:*

Be it known that I, LEO WALTER HILDBURGH, a citizen of the United States, residing in the borough of Manhattan, city of New York, county and State of New York, have invented certain new and useful Improvements in Asymmetrical Electrical Conductors, of which the following is a specification.

This invention relates to the class of electrical conductors known as "asymmetrical" conductors and which oppose the passage of a current in one direction while freely permitting the flow of a current in the opposite direction. In my application, Serial No. 659,376, filed November 22, 1897, I described such a conductor. One form of conductor therein described consists of inert and oxidizable electrodes dipping, respectively, into neutral and oxidizing electrolytes and producing a negligible current. By a "neutral" electrolyte, as explained in that application, is meant an electrolyte which has no action on either the electrode immersed in it or on the other liquid in the cell. The neutral electrolyte when the oxidizing-electrolyte is removed is neutral only toward the inert electrode and may combine with the material of the other electrode. I have found that the oxidizing-electrolyte can in some cases be dispensed with, the conductor then consisting of an inert and an oxidizable electrode in an electrolyte neutral to the inert electrode. The oxidizable or soluble electrode in a cell of this kind is continually dissolved by the action of the current passing during the operation of the device. If the electrolyte surrounding the active electrode be a solution of a salt of a metal other than that of the active electrode, the passage of the current will cause the production of an electrolyte differing from the original electrolyte and the cell will fall into the category of two-liquid cells. To remove the electrolyte thus formed, recourse may be had to the agitation of the electrolyte, to the use of an active electrode of a substance whose salt (or other compound formed) diffuses rapidly in the main mass of liquid or is not readily electrolytically decomposable, or to the use of an active electrode of a material a solution of whose salt forms the electrolyte.

The action supposed to take place in single-liquid cells is the following: When the current passes through the electrolyte from the active or soluble electrode toward the inert electrode, oxygen is deposited on the active and hydrogen on the passive electrode. The oxygen is immediately taken up by combination with the active electrode and is thus incapable of producing a counter electromotive force, while the electromotive force of the hydrogen deposited on the inert electrode is neutralized in whole or in part by the electromotive force of the substance composing the active electrode. The current passes then in this direction against little or no counter electromotive force and flows freely. When, however, the current passes through the electrolyte from the inert to the active electrode, hydrogen is deposited on the active and oxygen on the passive electrode. This causes the production of a considerable counter electromotive force, against which the current must flow, weakening it. If after the electrodes are covered with gas the impressed electromotive force is no higher than the counter electromotive force, no current can flow, making it possible by the use of a low enough impressed electromotive force to completely stop a current in one direction, while permitting the current in the opposite direction to pass.

The counter electromotive force is not produced instantaneously, but requires a certain time to rise to its full value, and this period is dependent on the area of the inert plate and the current flowing and in some cases is dependent upon the area of the active plate. Therefore in order to have the counter electromotive force rise quickly to its full value the size of the inert plate should be proportioned to the current flowing through it, and the larger the current flowing in the circuit the greater being the permissible size of the inert plate to maintain the same asymmetrical efficiency. Since the current in the circuit is dependent on the constants of the circuit— that is, its resistance, its capacity, its inductance, and the frequency of the impressed electromotive force—the size of the inert plate should be proportioned to these constants. It is found that the size of that plate bears a direct relation to the amount of asymmetry which may be produced in an alternating current—that is, to the "asymmetrical efficiency" of the device. To permit of the use of an alternating current of an electromotive force greater than can be economically asymmetrically affected by a single cell, a number of cells may be put in series, the series constituting the complete asymmetrical conductor. I have discovered that when this is done, the plates remaining the same size as before, no matter what the impressed electromotive force may be, the asymmetrical efficiency is increased. Increasing the number of cells constituting the asymmetrical conductor increases the resistance; but this increase in resistance may be counterbalanced by enlarging the plates. By enlarging the plates in proportion as the number of cells in series increases the asymmetrical efficiency and the resistance of the set of cells may be maintained nearly constant, while the ability to asymmetrically affect an alternating current of higher electromotive force is obtained.

The main requirement of the material forming the active electrode is that it be able to combine with or otherwise neutralize the substance brought to it by the current in one direction, and of the material composing the inert electrode that it be incapable of combining with or neutralizing that same substance when the current passes in the opposite direction, and of the whole combination of electrodes and electrolytes that it be incapable of producing by itself a current more than negligible in comparison with the final current produced by the rectification of the alternating current. Many substances can be used for the active electrode—among the metals copper, tin, silver, and hydrogen, and even, under the proper conditions, zinc, iron, lead, mercury, and aluminium, and among the non-metals carbon, oxygen, chlorin, coal-gas, &c. Aluminium when used under these conditions rectifies the alternating current in exactly the opposite sense from the rectification produced when the aluminium becomes coated with a layer of high-resistance aluminium hydroxid or oxygen.

The rectification produced when the aluminium acts as a soluble electrode permits the current to pass more freely through the electrolyte toward the inert plate; but the rectification produced when the aluminium acts by virtue of its film-forming properties permits the current to pass more freely through the electrolyte toward the aluminium plate. The former action generally takes place for only a limited time before the formation of the film which causes the latter action.

A very simple form of single-liquid cell can be constructed by placing a carbon and a platinum plate in dilute sulfuric acid, the active electrode being either of gas-carbon or of charcoal. In the latter case the action is greatly improved by first heating the charcoal to a high temperature and plunging into water, dilute sulfuric acid, &c., thus increasing its effective surface.

The use of the gaseous elements—hydrogen, oxygen, and chlorin—allows the device to become continuous acting. When the solid elements are used, they are gradually carried into solution and may in some cases stop the action of the device by forming a layer on the inert electrode. Gaseous elements, however, can be given off as bubbles from the inert electrode and can be caused to return to their original position at the active electrode, thus being used repeatedly and avoiding the waste of material inseparable in general from the use of a solid active electrode. Gaseous electrodes may be formed by placing a platinized platinum sheet partially in the electrolyte and partially in an atmosphere of the gas, the gas then being absorbed by the platinum-black and the whole acting like an electrode composed exclusively of the gas. The elementary gases which can thus be used with platinized platinum are hydrogen, oxygen, and chlorin, the first giving the best results. Other materials—such as carbon, palladium-black, &c.—can also be used in this same manner.

Figure 2:
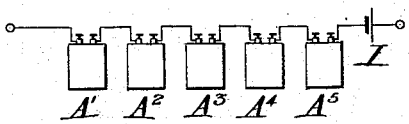

In the accompanying drawings, Figure 1 illustrates a typical continuous-acting cell constituting my improved asymmetrical conductor; and Fig. 2 illustrates a number of such cells connected in series with each other, the series of cells being connected in series with a source of direct electromotive force.

A small platinum electrode A, carried by a glass tube B, and a large platinized electrode C are placed in a sealed jar D, containing dilute sulfuric acid E and an atmosphere of hydrogen F. The electrodes are supported by two terminals or binding-posts G, mounted upon and sealed in the sealed cover H. The action of an alternating current of not too high electromotive force partially rectified by this device causes hydrogen continually to pass from C to A, from A in bubbles to F, and from F through C to A, the operation repeating itself indefinitely. Platinum need not be used as the basis of the platinizing, any inert conductor serving equally well. I have obtained good results from glass thinly plated with gold and platinized. Oxygen can be used in the same way in acid or alkaline solutions and chlorin in a solution of hydrochloric acid, though neither gives such satisfactory results as hydrogen. Oxygen can also be used as an electrode in the ordinary form of continuous or non-continuous cell in combination—as, for instance, with lead or copper. As peroxid of lead it may be used in acid solutions and as the black oxid of copper in alkaline solutions.

It has been found that in certain cases in which gaseous electrodes are used the asymmetrical efficiency of the device may be increased by reducing the pressure of the gas which supplies the active electrode. The reason for this is supposed to be that less work is wasted in the formation of bubbles at the inert electrode than when the pressure is higher, while the effectiveness of the active electrode is but slightly reduced. It has also been found that the addition of a comparatively small external electromotive force increases the asymmetrical efficiency, probably by supplying the excess of energy necessary for the formation of the bubbles at the inert electrode. This is accomplished by placing a source of direct current I of small electromotive force in series with the set of similarly-formed cells A' A⁵, (shown in Fig. 2,) comprising the asymmetrical conductor.

By a "soluble" electrode I mean an electrode whose active element is caused by the action of the current to dissolve, and not necessarily one in which the whole material is soluble. A copper electrode, for example, is composed of a material the whole of which is soluble under the conditions affecting its use; but gaseous electrodes are considered soluble only so far as concerns their gaseous elements. In a hydrogen electrode only the hydrogen is soluble, the material by which it is occluded being considered as insoluble. In an oxygen electrode only the oxygen is soluble, the lead or copper with which it is combined being considered insoluble.

What I claim is—

1. The combination of a soluble electrode and an inert electrode with an electrolyte, capable of producing no more than a negligible current, for the purpose of permitting the flow of current more freely from the soluble electrode through the electrolyte to the inert electrode than in the opposite direction.

2. In an asymmetrical conductor, the combination of a soluble electrode and an inert electrode with an electrolyte, means being provided for causing the substances carried from the soluble electrode to the inert electrode by electrolytic action to return to the active electrode.

3. In an asymmetrical conductor, the combination of a gaseous electrode and an inert electrode with an electrolyte for the purpose of permitting the return of the gases discharged from the inert electrode to the active electrode from which they came.

4. In an asymmetrical conductor having soluble electrodes, the combination of gaseous electrodes and inert electrodes with an electrolyte under a pressure less than that of the atmosphere, for the purpose of increasing the asymmetrical efficiency of the combination.

5. An irreversible combination consisting of an inert and a soluble electrode with an electrolyte producing only a negligible current, said combination permitting the flow of current more freely from the soluble electrode through the electrolyte to the inert electrode than in the opposite direction.

6. In an asymmetrical conductor, the combination with an electrolyte, of one or more soluble electrodes, and one or more inert electrodes whose area is proportioned to the character of the circuit, its resistance, capacity, inductance, and frequency of impressed electromotive force whereby the total efficiency is adapted to the nature of the work to be done.

7. In an asymmetrical conductor having soluble electrodes, the combination of several similar asymmetrically-conducting parts in series in which the area of the inert electrodes is proportioned to the number of such parts, said inert electrodes being of such size as to maintain the electrolytic capacity of the conductor approximately the same while permitting the economical use of a proportionally higher impressed alternating electromotive force.

8. In an asymmetrical conductor, the combination of a series of asymmetrical cells and an external source of electromotive force, such electromotive force being small as compared with the impressed alternating electromotive force, for the purpose of increasing the asymmetrical efficiency.

9. A device consisting of a soluble electrode and an inert electrode in an electrolyte capable of producing no more than a negligible current and having a counter electromotive force greater when the current passes through the electrolyte toward the soluble electrode than in the opposite direction.

10. A device consisting of a soluble electrode and an inert electrode in an electrolyte producing no more than a negligible current and in which the substances carried to either or both electrodes by a current flowing through it in one direction are immediately removed, while the substances carried to either or both electrodes by a current flowing through it in the opposite direction are allowed to remain.

11. A device consisting of an electrolyte, an electrode possessing the ability to cause oxygen to disappear from its surface, and an electrode not possessing that ability, said device producing no more than a negligible current and permitting a greater flow of current in one direction than in the opposite direction.

12. A device consisting of a soluble electrode and an inert electrode in an electrolyte composed of a solution containing a compound of the soluble electrode, said device permitting a greater flow of current from the soluble electrode through the electrolyte to the inert electrode than in the opposite direction.

13. A device consisting of a soluble electrode and an inert electrode in an electrolyte composed of a solution containing a compound of the soluble electrode, said device producing no more than a negligible current and permitting a greater flow of current through the electrolyte to the inert electrode than in the opposite direction.

14. A device consisting of a soluble electrode whose area is not limited by the character of the circuit, an insoluble electrode whose area is limited, and an electrolyte, said device permitting a greater flow of current in one direction than in the opposite direction.

15. In an asymmetrical conductor, the combination of two electrodes with an electrolyte, one of said electrodes being soluble and whose electromotive force is constant in direction and approximately constant in value, and the other electrode having an electromotive force variable in direction and value.

16. The combination of a gaseous electrode and an inert electrode with a solution containing a compound of the gaseous electrode for the purpose of permitting the flow of current more freely in one direction than in the opposite direction.

17. The combination of a hydrogen electrode and an inert electrode with a solution containing a compound of the hydrogen electrode for the purpose of permitting the flow of current more freely in one direction than in the opposite direction.

18. The combination of a gaseous electrode, a metallic electrode, and an electrolyte for the purpose of permitting the flow of current more freely from the gaseous electrode through the electrolyte to the metallic electrode.

19. In an asymmetrical conductor, the combination of a gaseous electrode, a metallic electrode, an electrolyte, and means for causing the substance carried from the gaseous electrode to the non-gaseous electrode by electrolytic action to return to the gaseous electrode.

This specification signed and witnessed this 20th day of April, 1899.

LEO WALTER HILDBURGH.

Witnesses:
J. O. EDMONDS,
WM. PELZER.